United States Patent
Palm et al.

(10) Patent No.: US 8,269,513 B2
(45) Date of Patent: Sep. 18, 2012

(54) METHOD AND DEVICE FOR MONITORING AND ELECTRICAL HEATING APPARATUS

(75) Inventors: Berthold Palm, Köln (DE); Günter Grommes, Trosdorf (DE)

(73) Assignee: Siemens Aktiengesellschaft, München (DE)

( * ) Notice: Subject to any disclaimer, the term of this patent is extended or adjusted under 35 U.S.C. 154(b) by 706 days.

(21) Appl. No.: 11/992,326

(22) PCT Filed: Aug. 11, 2006

(86) PCT No.: PCT/EP2006/065264
§ 371 (c)(1),
(2), (4) Date: May 13, 2009

(87) PCT Pub. No.: WO2007/033872
PCT Pub. Date: Mar. 29, 2007

(65) Prior Publication Data
US 2010/0060291 A1    Mar. 11, 2010

(30) Foreign Application Priority Data
Sep. 20, 2005    (DE) .................. 10 2005 044 831

(51) Int. Cl.
*G01R 27/08*    (2006.01)
*G01R 31/00*    (2006.01)

(52) U.S. Cl. .................. 324/691; 324/537; 324/750.09; 324/750.11; 219/484; 425/135; 425/144

(58) Field of Classification Search ..... 324/537–750.13; 219/482–487; 425/135–150
See application file for complete search history.

(56) References Cited

U.S. PATENT DOCUMENTS

| | | | | |
|---|---|---|---|---|
| 2,319,482 A | * | 5/1943 | Tucker | 264/328.4 |
| 4,102,958 A | * | 7/1978 | Wertz | 264/40.6 |
| 4,707,310 A | * | 11/1987 | Debeaud | 264/40.6 |
| 4,933,126 A | * | 6/1990 | Shuman | 264/40.6 |
| 5,340,964 A | | 8/1994 | Galloway | |
| 5,360,329 A | * | 11/1994 | Lemelson | 425/143 |
| 5,456,870 A | * | 10/1995 | Bulgrin | 264/40.6 |
| 2007/0057394 A1 | * | 3/2007 | Linehan | 264/40.6 |
| 2008/0241299 A1 | * | 10/2008 | Bazzo et al. | 425/144 |

FOREIGN PATENT DOCUMENTS

| | | |
|---|---|---|
| DE | 2901160 A1 | 7/1980 |
| DE | 3819234 A1 | 1/1989 |
| DE | 4016075 A1 | 11/1991 |
| DE | 19835622 A1 | 2/2000 |
| DE | 20320474 U1 | 9/2004 |
| JP | 61116920 A | 6/1986 |
| JP | 10058506 A | 3/1998 |
| JP | 2005088225 A | 4/2005 |

* cited by examiner

*Primary Examiner* — Melissa Koval
*Assistant Examiner* — Emily Chan

(57) ABSTRACT

The invention relates to a method for monitoring an electrical heating apparatus and to a corresponding apparatus. The electrical heating apparatus has at least one heating element. A measured value, which is dependent on the resistance and/or the inductance of the electrical heating element, is measured, the measurement being carried out by means of the measured value being sampled. Owing to the use of sampled values, the measurement process can be shortened.

13 Claims, 1 Drawing Sheet

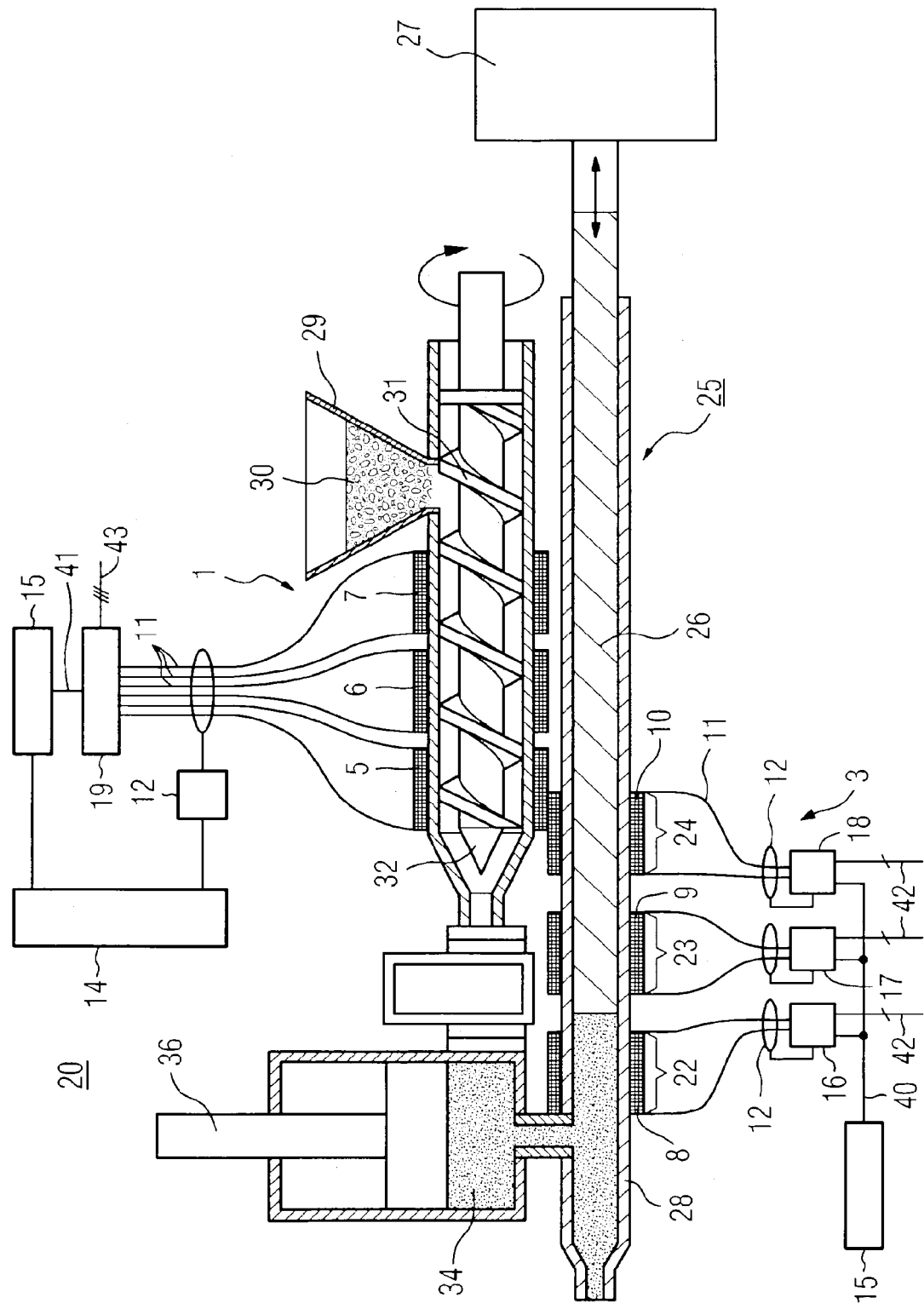

METHOD AND DEVICE FOR MONITORING AND ELECTRICAL HEATING APPARATUS

CROSS REFERENCE TO RELATED APPLICATIONS

This application is the U.S. National Stage of International Application No. PCT/EP2006/065264, filed Aug. 11, 2006 and claims the benefit thereof. The International Application claims the benefits of German application No. 10 2005 044 831.3 filed Sep. 20, 2005, both of the applications are incorporated by reference herein in their entirety.

FIELD OF INVENTION

The invention relates to a method for monitoring an electrical heating apparatus which has at least two heating elements.

BACKGROUND OF THE INVENTION

In order to be able for example to establish the heating efficiency or, as the case may be, detect the failure of a heating element, it is necessary to monitor the electrical heating current which flows through the heating elements. This is important in particular during the melting of plastic e.g. in the hot flow channels (hot runners) in the injection tool (mold) in the case of a plastic injection molding machine, since there a small temperature deviation of the plastic melted by means of the heating elements affects the material properties of the plastic melt. This can have a negative impact for example on an injection operation in the case of a plastic injection molding machine for manufacturing plastic parts. In a plastic injection molding machine, plastic granulate is melted for example both in a preplastification unit and in a downstream plastification unit. In an injection tool there can be hot runners in which the temperature of the plastic melt must be maintained. Plastification units and hot runners of said type have heating elements which are fed e.g. by a zero point switching solid-state relay (current relay), with the temperature being controllable by regulating the electric current conducted through the heating elements. Other areas of application for electrical heating apparatuses which have heating elements are, for example, air conditioning systems for clean or ultraclean currents, or heating systems that are used for chemical processes, in which case a reaction chamber for a chemical process, for example, can also be operated in a temperature-controlled manner by means of an electrical heating system.

If the electrical heating system, which is to say the electrical heating apparatus, is used in particular in an area which requires precise regulation of temperature, then it is necessary to monitor the heating efficiency of the electrical heating system accurately at all times. Monitoring of this kind should of course be realizable with little overhead, as well as lead to reliable results. Furthermore measurements in sensitive zones should be carried out quickly and without disrupting the control operation or the control quality in respect of the regulation of temperature. This relates in particular to hot runners.

A known approach to a solution is the use of a summation current transformer for measuring the root-mean-square value of an alternating current. In the case of summation current regulation the summation current of the electrical heating system, in other words the summation current of the different electrical heating elements, is measured and evaluated. This approach has the advantage of low technical overhead. A disadvantage with using a summation current controller is that during the regulation of the temperature all the heating elements are in operation and consequently only the operation of the totality of heating elements can be checked. Checking the heating elements individually is not possible. If it is desired to carry out an individual check, then individual heating elements must always be switched on selectively, while all other runners have to be switched off. However, this causes a disruption to the regulating operation, since during this time the material requiring to be heated can disadvantageously cool down. This problem is also exacerbated thereby when fast-reacting controlled systems are present and when temperature-sensitive material is processed.

Fast and reliable monitoring of the heating current is possible in the case of individual current measuring. This is a reliable monitoring method that does not cause a disruption to a temperature regulating operation. A disadvantage therein, however, is the high overhead that is necessary for this, since every heating element of the electrical heating system requires a sensor such as e.g. a current transformer.

SUMMARY OF INVENTION

Each of the known methods for monitoring the electrical heating apparatus has certain disadvantages. The object underlying the invention is to create an improved method for monitoring an electrical heating apparatus and a correspondingly improved apparatus.

The object is achieved in the case of a method having the features of the claims. This object is further achieved by means of an apparatus having the features according to the claims, as well as in the case of a plastic injection molding machine according to the claims. The claims disclose further inventive embodiments of the corresponding method and the corresponding apparatus.

The method according to the invention serves for monitoring an electrical heating apparatus, said electrical heating apparatus having at least one heating element. The electrical heating apparatus is provided for example for the purpose of melting a plastic, for the purpose of tempering the hot runners contained in the injection molding die, for the purpose of heating a liquid or as heating for a building or room. Since high requirements are placed on the control quality of a regulated electrical heating apparatus in the case of plastic injection molding machines, the invention is advantageously used in the case of a machine of this type.

In a method for monitoring an electrical heating apparatus which has at least one heating element, a measured value that is dependent on the resistance and/or inductance of the electrical heating element is measured, the measurement being carried out by means of a fast sampling of the measured value. A passive current transformer which supplies a measurable signal serves as the sensor. The non-rectified measured signal is sampled via a high-speed analog/digital converter which can sample the current profile of an alternating current.

Owing to the use of a sampling of the measured value, which is an electrical current or an electrical voltage for example, the signal shape of the measured value measured value can be recorded. It is no longer necessary to rectify the signal or to perform a protracted analog value conversion by means of sawtooth methods which require an ON time of up to one second and more. As a result a measuring device for measuring measured values of different heating elements can be used for example. Furthermore heating currents can also be measured in the case of a short ON time.

If the electrical heating apparatus has at least two heating elements, with a measured value dependent on the resistance and/or, inductance of the electrical heating elements of at least two heating elements being measurable jointly by means of one measuring device, the current profile of the summation current is advantageously measured during the regulation and compared with a reference value of the summation current. The reference value of the summation current results from the summation of the individual currents, measured for example by teaching, of the heating currents that have just been connected by the controller. The controller transmits this information in realtime to the monitoring device. This advantageously takes place by means of a short and quick clock-synchronous connection between the control unit and the monitoring device. It is no longer necessary to switch on or switch off individual controllers selectively for measurement purposes.

If, however, the energization of at least one heating element is completely or partially suspended, this happens within one half-wave or a few half-waves of the alternating current, the measured value being compared with a comparison value. By suspending the energization of a heating element it is possible to record the measured value of just one heating element. As a result of using sampled values for the value to be measured it is no longer necessary to disconnect a heating element for a relatively long period of time lasting several seconds.

If the heating element is fed by an alternating current, a period of one or more half-waves is sufficient for the measurement. This has the advantage that the monitoring will have no effect on a regulation of temperature, the electrical heating apparatus being an actuator of said temperature regulation. As a result of the regulation the heating elements can switched on and/or off for different lengths of time, in different sequences and in different combinations. This causes individual heating elements to be in the operating state of being switched off at irregular intervals. By evaluating stored operating states of the heating elements and stored measured values the monitoring device can identify defective heating elements by means of an exclusion method.

In addition, a value dependent on the resistance and/or inductance of the electrical heating elements is advantageously measured jointly in at least two heating elements for the purpose of monitoring the electrical heating apparatus, the latter also representing a device and also being able to be referred to as an electrical heating system, after which a measured value is compared with a comparison value. A value of the electrical heating element that is dependent on the resistance is for example the current in the case of a known voltage value or the voltage in the case of a known current value. The joint measurement of the value dependent on the resistance and/or inductance of the electrical heating elements is performed in particular by means of a sensor jointly used herefor for measuring for example the current or the voltage. Said measured value is processed in a processing device, which is in particular a monitoring device and which is for example a controller or a regulator. The processing is accomplished for example by comparison of the measured value or of different measured values with stored reference values.

A comparison can also performed such that a measured value of a first electrical heating element is compared with the measured value of a second electrical heating element, in which case, assuming the electrical heating elements are identical, the measured values should not deviate substantially from one another during the measurement.

If the deviation is greater than a predefined maximum differential value, a warning or fault message is generated for example;The comparison takes place for example in a controlling or regulating device for regulating temperature. In order to monitor the electrical heating system and the proper operation of the individual electrical heating elements the measurement of individual values is advantageously performed in the millisecond range. However, it is also possible, in the event that an alternating current or an alternating voltage is used to feed the heating elements, to measure the precise time characteristic of current or voltage. For this purpose fast analog inputs are advantageously used for feeding the measured values recorded by the sensor in a controller or regulator. By using a sensor and an analog input in a controlling or regulating device which enables measuring points to be measured in accordance with the sampling theorem it is possible to monitor individual electrical heating elements by means of a brief measurement. Owing to the fast current profile measurement during short ON times it is possible to perform a reliable measurement even in the run-in state of the machine with fast clocked heating currents without affecting the control process.

In an advantageous embodiment of the method according to the invention the measurement is synchronized with a trigger signal. The synchronization with a trigger signal enables reproducible measurement results to be achieved. An example of a trigger signal is the zero crossing of an alternating current or of an alternating voltage.

In a further embodiment of the method, the energization of at least one heating element or a group of heating elements is suspended completely or partially during the measurement in order to enable the monitoring of individual electrical heating elements or the monitoring of a group of electrical heating elements without being influenced by a further group of electrical heating elements. If, for example, a trigger signal is used, as of a certain instant in time the measurement can be carried out and during said measurement the energization of some of the electrical heating elements can be suspended. This takes place for example in the case of energization by means of current converters by closing the current converter valves or by activation of a relay.

If at least two electrical phases are used to energize the electrical heating elements, it is advantageous that for example a sensor is provided for one phase, while for example two or more electrical heating elements can be energized by means of one phase. The electrical heating elements are interconnected either serially or in parallel.

If one sensor is used for two electrical phases for measurement purposes, then in this case also, while for example the current in the first phase is being measured, the current flow in the second phase can advantageously be suppressed.

In an advantageous embodiment of the method this is used during the monitoring of heating elements which are provided for melting a plastic or which serve for tempering the hot runners in the injection tool. This relates in particular to use in a plastic injection molding machine. With machines of this type, precise temperature control of the plastic melt is of particular importance because the temperature has a great influence on the material properties of the plastic melt and consequently also on the quality of the plastic injection molded parts that can be manufactured by means of the plastic injection molding machine.

In an advantageous embodiment a monitoring device which has an intelligent device for measuring a heating current is used for the monitoring, said intelligent device receiving information about which zones of a heating apparatus are switched active or inactive in a plastic injection molding machine. Zones of an electrical heating apparatus in a plastic injection molding machine can therefore be clocked in and out. A zone of an electrical heating apparatus has at least one heating element.

The monitoring device can be implemented for example such that this rapidly samples the input current (alternating current switched in the zero point) at intervals of a few milliseconds. Each switched half-wave can be measured. The building up of integrating converters is therefore unnecessary.

In a further method step the monitoring device compares the reference summation heating current with the actual summation heating current in realtime. For this purpose the monitoring device receives the information of the clocked heating currents. This can take place for example via a peripheral bus, such as for example the PROFIBUS. The reference values are also stored internally in the monitoring device. The system can learn this information. Each control operation can be monitored. This is ensured by fast fault reporting. Only in the case of a fault do the zones of an electrical heating system need to be clocked individually in order to locate the affected zone. The controller or the regulation of the temperature itself is advantageously neither affected nor disrupted in this case. This succeeds in particular as a result of the use of short measuring times.

Thus, the method according to the invention enables monitoring which permits low overhead through the use of sampled values. Furthermore this monitoring method is reliable and quick, since the measurement can be carried out in realtime. It is also advantageous that the quality of control is not adversely affected because the zones of an electrical heating apparatus can be clocked specifically for current monitoring.

In an advantageous embodiment the clocking of the electrical heating elements in a heating apparatus for controlling a temperature is therefore used to enable simultaneous monitoring of these electrical heating elements.

In a further embodiment of the method the monitoring device is connected for data communication purposes to a regulating and/or control device. The regulating and/or control device is provided for regulating and/or controlling the temperature. For this operation the heating elements are switched on and/or off by means of said device or supplied with different reference current intensities. By means of the regulating and/or control device it is therefore possible to determine the reference value of a summation current measurement. Said reference value is compared with the measured actual value. Since the time sequence of the energization of the heating elements can also be determined and stored by means of the regulating and/or control device, it is possible to perform monitoring by means of a logical time-dependent comparison of reference and actual values of the measured value. Using a logical exclusion method a fault in a heating element can be identified by means of measurements with different combinations of active heating elements.

The following example illustrates this: The heating apparatus in the example now described has five heating elements 1 to 5. If the heating element 3 is now defective, this can be discovered for example by means of the following measurements, all the measurements advantageously being carried out using only one sensor by means of which the electrical current of all the heating elements are measured simultaneously.

Measurement of the electrical current when the heating elements 1 and 2 are active:
actual value=reference value (the heating elements 1 and 2 are OK)

Measurement of the electrical current when the heating elements 3 and 5 are active:
actual value≠reference value (from this measurement it is not clear whether the heating element 3 or 5 is defective)

Measurement of the electrical current when the heating elements 1 and 4 are active:

actual value=reference value (the heating element 4 is also OK)

Measurement of the electrical current when the heating elements 3 and 4 are active:
actual value≠reference value (from this measurement it is clear that the heating elements 3 is defective, because it was established previously that the heating element 4 is OK).

By means of a data exchange between the regulating and/or control device 15 for regulating and/or controlling the heating elements and the monitoring device in relation to the active heating elements, deductions concerning the OK status or NOT-OK status (defect) of one or more heating elements can be made based on logical operations on identified OK and NOT-OK statuses that have been collected and stored over time. Said logical operation is performed for example in the monitoring device. The monitoring device may be completely or partially integrated in the regulating and/or control device.

The sequence of activity of the heating elements shown in the above example is dependent on the regulating and/or control device and advantageously is independent of an influence of the monitoring device.

In an inventive apparatus for monitoring an electrical heating apparatus which has one heating element or at least two electrically parallel or independently energizable heating elements, a sensor is provided for sampling a measured value, the measured value being dependent on the resistance and/or inductance of the electrical heating element.

In a further embodiment of the inventive apparatus for monitoring an electrical heating apparatus which has at least two electrically parallel or independently energizable heating elements, a sensor is provided for jointly measuring a value of two heating elements which is dependent on the resistance and/or inductance of the electrical heating elements. In this case it is advantageous if at least two heating elements can be energized separately from each other by at least two relays. A corresponding apparatus is advantageously used for carrying out one of the above-described methods.

The apparatus is expandable such that the monitoring device is connected for data communication purposes to the regulating and/or control device, the regulating and/or control device being provided for regulating and/or controlling the heating elements and the data transmission relating to data concerning the sequence of ON states of the heating elements.

The use both of the method and of the apparatus is advantageous in particular in the case of plastic injection molding machines. With plastic injection molding machines in particular, precise and accurate temperature regulation and monitoring is necessary in order to improve the quality of the product manufactured from plastic.

BRIEF DESCRIPTION OF THE DRAWINGS

Further advantages and details will emerge from the following description of an exemplary embodiment:

FIG. 1 shows an electrical heating apparatus for a plastic injection molding machine.

DETAILED DESCRIPTION OF INVENTION

The illustration according to the figure shows an injection unit 25 of a symbolically represented plastic injection molding machine 20. The injection unit 25 has an injection piston 26. The injection piston 26 is linearly movable in a piston cylinder 28 by means of a linear drive unit 27. According to the figure the injection is separate from the plastification. For the plastification process, plastic granulate 30 for example can be fed to a screw 31 by means of a hopper 29. By means of the screw 31 the plastic granulate 30 can be conveyed toward a screw tip 32. While the granulate 30 is being conveyed it can be melted by means of an electrical heating apparatus 1. In the present example the electrical heating apparatus 1 has three heating elements 5, 6 and 7. Each of the electrical heating elements 5, 6 and 7 can be supplied with electrical current via electrical connecting leads 11. The electrical current flowing through the electrical connecting leads can be measured by means of a sensor 12. The sensor 12 is connected to a monitoring device 14. Said monitoring device 14 compares the measured actual values of the electrical current with stored reference values. If a heating element 5, 6 or 7 has for example heating coils which have burned out in a fault situation, the fault can be identified by comparisons of the actual values with the reference values. The monitoring device 14 is connected for data communication purposes to a regulating and/or control device 15 via a data communication link. The regulating and/or control device 15 is in turn connected to relays 19 by means of a data communication link 41. The relays 19 are connected to a three-phase alternating current 43.

Heating apparatuses are used in plastic injection molding machines also as an injection tool heating entity or also as a nozzle heating entity. However, these heating apparatuses are not shown in the figure.

The plastic granulate melting due to the electrical heating apparatus 1 is conveyed by means of a rotary movement of the screw 31 into a melt accumulator 34. The screw 31 can be in operation continuously because the melt in the melt accumulator 34 can be buffered and transferred from the melt accumulator 34 into the piston cylinder. This succeeds because the melt accumulator 34 can be increased or reduced in size via an accumulator piston 36. If the melt accumulator 34 is made smaller, the melt is compressed into the piston cylinder 28 via an accumulator opening 38. Positioned in the area of the piston cylinder 28 is a further electrical heating apparatus 3 by means of which the melt can be heated in addition. The screw 31 advantageously conveys the produced plastic melt into the melt accumulator 34 continuously until the injection piston 26 has completed the injection and recompressing operations. For a new injection operation, melt is again pressed into the piston cylinder 28 by means of the accumulator piston 36.

Like the electrical heating apparatus 1, the electrical heating apparatus 3 has heating elements 8, 9, 10. The electrical heating elements 8, 9, 10 can be connected by means of electrical connecting leads 11 to relays 16, 17 and 18, each of the latter having a single-phase alternating current terminal 42. Said relays 16, 17 and 18 are advantageously solid-state relays, since these enable fast switching operations and frequent changing of switching states. Current converters can also be used in place of relays. The monitoring device 14 can advantageously be integrated into the regulating and/or control device 15 for controlling the relays 16, 17 and 18. Integrating the regulating and/or control device into one or more current converters or relays is also possible, but not shown. The relays of the electrical heating apparatus 1 are only shown together symbolically in the figure.

The relays 16, 17 and 18 can be easily controlled by means of a 2-point controller. The relays 16, 17 and 18 are connected to sensors 12 for the purpose of measuring the electrical current in the electrical connecting leads 11. By means of the sensor 12 it is not only possible to control the electrical current through the relays 16, 17 and 18, since the sensor 12 measures the actual:value; in addition the sensor 12 can also be used to monitor the operational reliability of the heating elements 8, 9, 10. If a heating element 8, 9, 10 is defective, then the reference resistance for example is different from an actual resistance calculated from the measured actual values. The monitoring of the heating elements 8, 9, 10 is integrated in the electrical heating apparatus 3 in one or more relays 16, 17 or 18. Each heating element 8, 9, 10 is provided for the purpose of heating a specific zone 22, 23 and 24. The heating is regulated, a high quality of control having to be maintained during the regulation of the heating temperature. Thus, in order not to impair the quality of control unnecessarily, the monitoring function is activated only during the period of one half-wave or a small number of half-waves of the alternating current for the purpose of monitoring the operation of the heating elements 5, 6, 7, 8, 9 and 10. During the activation only one heating element is energized, with the result that with one sensor 12 only the measured value for said energized heating element 5, 6, 7 is measured. For the purpose of monitoring several heating elements 5, 6, 7, therefore, only one sensor 12 is necessary, as shown in the case of the electrical heating apparatus 1.

The invention claimed is:

1. A method for monitoring an electrical heating apparatus having a plurality of electrical heating elements fed by an alternating current, the method comprising:

arranging a sensor to jointly measure a measured value associated with each of the electrical heating elements, wherein the measured value associated with each of the electrical heating elements depends upon a resistance or inductance of the respective electrical heating element;

connecting the sensor to a monitoring device;

measuring an actual measured value associated with each of the electrical heating elements, wherein the measured value associated with each of the electrical heating elements depends upon a resistance or inductance of the respective electrical heating element, the measurement being performed by sampling of the actual measured value during a measurement period, wherein the measurement period corresponds to a half-wave of the alternating current, and wherein energization of at least one heating element during is suspended during the measurement;

comparing the actual measured value to a predetermined comparison value; and determining if a fault exists based on the comparison between the actual measured value and the predetermined comparison value.

2. The method as claimed in claim 1, wherein the measurement is synchronized with a trigger signal, the trigger signal being a periodic signal associated with an alternating current or voltage.

3. The method as claimed in claim 2, wherein a plurality of electrical phases are used for energizing the heating elements, only one electrical phase carries current during the measurement.

4. The method as claimed in claim 3, wherein the heating elements provide heat to melt plastic for a plastic injection molding machine.

5. The method as claimed in claim 4, wherein the monitoring device is connected to a regulating and/or control device for data communication, where the regulating and/or control device regulates and/or controlls the heating elements, with regulating and/or control data being used for monitoring purposes.

6. An apparatus for monitoring an electrical heating apparatus having a plurality of heating elements fed by an alternating current, the apparatus comprising:

a sensor that jointly measures a measured value associated with each of the electrical heating elements, wherein the measured value for each of the electrical heating elements is dependant on the resistance or inductance of the respective electrical heating element, the sensor being configured to perform the measurement by sampling of the actual measured value during a measurement period, wherein the measurement period corresponds to a half-wave of the alternating current, and wherein energization of at least one heating element during is suspended during the measurement and a monitoring device connected to the sensor that compares an actual measured value from the sensor to a predetermined comparison value and determines if a fault exists based on the comparison between the actual measured value and the predetermined comparison value.

7. The Apparatus as claimed in claim 6, wherein the sensor is an instantaneous value converter.

8. The apparatus as claimed in claim 7, wherein a plurality of electrically parallel or independently energizable heating elements are energized separately from each other via a plurality of relays.

9. The apparatus as claimed in claim 8, wherein a monitoring device is connected to a control device and the control device controls the operation of the heating elements.

10. A plastic injection molding machine, comprising:
a granulate hopper that holds a granulate plastic material;
a screw drive that receives and conveys the granulate plastic material;
an electrical heating apparatus arranged along the screw drive, wherein the electrical heating apparatus has a plurality of heating elements fed by an alternating, current, the electrical heating apparatus further comprising:

a sensor that jointly measures a measured value associated with each of the electrical heating elements wherein the measured value for each of the electrical heating elements is dependant on the resistance or inductance of the electrical heating element, the sensor being configured to perform the measurement by sampling of the actual measured value during a measurement period, wherein the measurement period corresponds to a half-wave of the alternating current, and wherein energization of at least one heating element during is suspended during the measurement; and a monitoring device connected to the sensor that compares an actual measured value from the sensor to a predetermined comparison value and determines if a fault exists based on the comparison between the actual measured value and the predetermined comparison value;

an injection unit having an injection piston; and
a linear drive unit connected to the injection piston.

11. The machine as claimed in claim 10, wherein the sensor is an instantaneous value converter.

12. The machine as claimed in claim 11, wherein a plurality of electrically parallel or independently energizable heating elements are energized separately from each other via a plurality of relays.

13. The machine as claimed in claim 12, wherein a monitoring device is connected to a control device and the control device controls the operation of the heating elements.

* * * * *